United States Patent
Liu et al.

(10) Patent No.: US 11,216,967 B2
(45) Date of Patent: Jan. 4, 2022

(54) QUEUE INFORMATION ANALYZING METHOD AND RELATED IMAGE ANALYZING APPARATUS

(71) Applicant: VIVOTEK INC., New Taipei (TW)

(72) Inventors: Cheng-Chieh Liu, New Taipei (TW); Chih-Yen Lin, New Taipei (TW)

(73) Assignee: VIVOTEK INC., New Taipei (TW)

( * ) Notice: Subject to any disclaimer, the term of this patent is extended or adjusted under 35 U.S.C. 154(b) by 118 days.

(21) Appl. No.: 16/455,621

(22) Filed: Jun. 27, 2019

(65) Prior Publication Data
US 2020/0051270 A1 Feb. 13, 2020

(30) Foreign Application Priority Data
Aug. 7, 2018 (TW) ................................. 107127394

(51) Int. Cl.
*G06K 9/00* (2006.01)
*G06T 7/70* (2017.01)
*G06T 7/20* (2017.01)

(52) U.S. Cl.
CPC .................. *G06T 7/70* (2017.01); *G06T 7/20* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

| | | | | |
|---|---|---|---|---|
| 2010/0328443 | A1* | 12/2010 | Lynam | G06K 9/036 348/77 |
| 2013/0182114 | A1* | 7/2013 | Zhang | A61B 5/0046 348/150 |
| 2014/0267738 | A1* | 9/2014 | Allen | H04N 7/188 348/156 |
| 2015/0312529 | A1* | 10/2015 | Bernal | G06T 7/246 348/148 |
| 2019/0303684 | A1* | 10/2019 | Khadloya | G06K 9/00771 |

FOREIGN PATENT DOCUMENTS

| | | |
|---|---|---|
| CN | 103916641 A | 7/2014 |
| CN | 105139040 A | 12/2015 |
| CN | 103942773 B | 5/2017 |

* cited by examiner

*Primary Examiner* — Wei Wen Yang
(74) *Attorney, Agent, or Firm* — Winston Hsu (57) ABSTRACT

A queue information analyzing method is applied to an image analyzing apparatus. A monitoring image captured by the image analyzing apparatus has a triggering area. The queue information analyzing method includes identifying a first candidate object stayed within the triggering area, forming a sampling range via the first candidate object, determining whether a second candidate object stayed within the sampling range belongs to a queue of the first candidate object, and acquiring an amount and a accumulated time of candidate objects about the queue.

20 Claims, 10 Drawing Sheets

QUEUE INFORMATION ANALYZING METHOD AND RELATED IMAGE ANALYZING APPARATUS

BACKGROUND OF THE INVENTION

1. Field of the Invention

The present invention relates to a queue information analyzing method and a related apparatus, and more particularly, to a queue information analyzing method capable of determining an amount and a accumulated time of line-up objects inside a queue and a related image analyzing apparatus.

2. Description of the Prior Art

With the advanced technology, the commercial firm collects and analyzes consumption data to amend and improve service quality and conduction efficiency. The commercial firm may analyze customer statistics to identify the popular merchandise, the unpopular merchandise, arranged position of the merchandise with preferred attention or petty attention, and a furnished trace of the merchandise, but does not record information of line-up customers around the checkout counter for analysis. A conventional method may assign a manager to observe an amount and an intensity of the line-up customers around the checkout counter, and the manager can allocate the clerks to open the newly-added checkout counter or close the surplus checkout counter for evacuating or gathering up the line-up customers. Thus, design of an image analyzing method and a related apparatus capable of identifying the line-up customer and the passing-by person, and automatically recording and analyzing an amount and a staying time of the line-up customer is an important issue in the monitoring industry.

SUMMARY OF THE INVENTION

The present invention provides a queue information analyzing method capable of determining an amount and a accumulated time of line-up objects inside a queue and a related image analyzing apparatus for solving above drawbacks.

According to the claimed invention, a queue information analyzing method is applied to an image analyzing apparatus, and a monitoring image acquired by the image analyzing apparatus has a triggering area. The queue information analyzing method includes identifying a first candidate object stayed within the triggering area, forming a sampling range via the first candidate object, determining whether a second candidate object stayed within the sampling range belongs to a queue of the first candidate object, and acquiring an amount and a staying time of candidate objects in the queue according to a determination result of the second candidate object.

According to the claimed invention, an image analyzing apparatus includes an image receiver and an operation processor. The image receiver is adapted to acquire a monitoring image. The operation processor is electrically connected to the image receiver. The operation processor is adapted to identify a first candidate object stayed within the triggering area, form a sampling range via the first candidate object, determine whether a second candidate object stayed within the sampling range belongs to a queue of the first candidate object, and acquire an amount and a accumulated time of candidate objects in the queue according to a determination result of the second candidate object for acquiring line-up object information inside the monitoring image.

The queue information analyzing method and the image analyzing apparatus of the present invention can analyze the monitoring image to rapidly acquire information of the line-up customer, to accurately distinguish the customers in the checkout counter from the line-up customers, and to compute the amount, a total staying time and an average staying time of the line-up customers, so that the shopkeeper can realize line-up information of the customers for assigning the shop clerk to rearrange the crowded customers or reassigning the shop clerk to improve work productivity. Comparing to the prior art, the present invention can utilize image analyzing technique to acquire the line-up information, and accordingly rearrange the clerks for preferred service quality.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
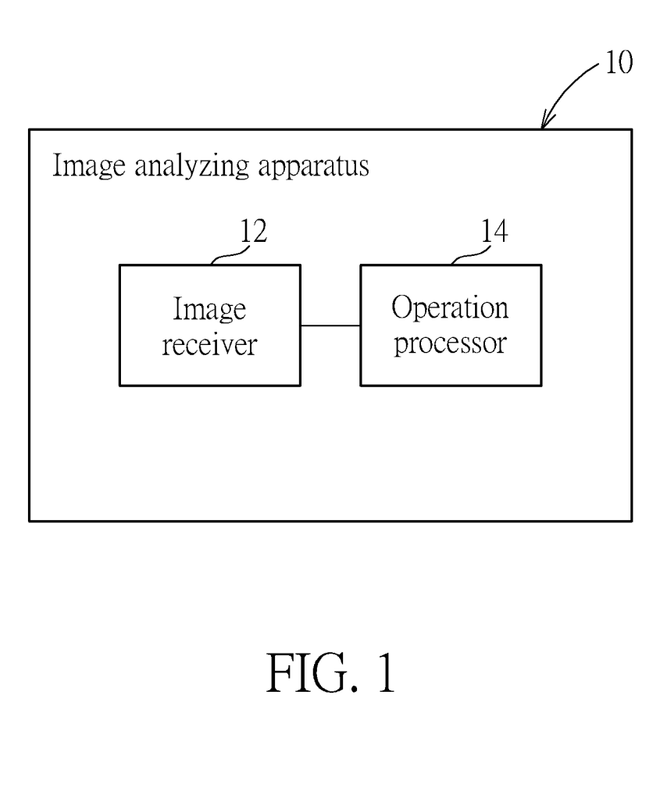
FIG. 1 is a functional block diagram of an image analyzing apparatus according to an embodiment of the present invention.
Figure 2:
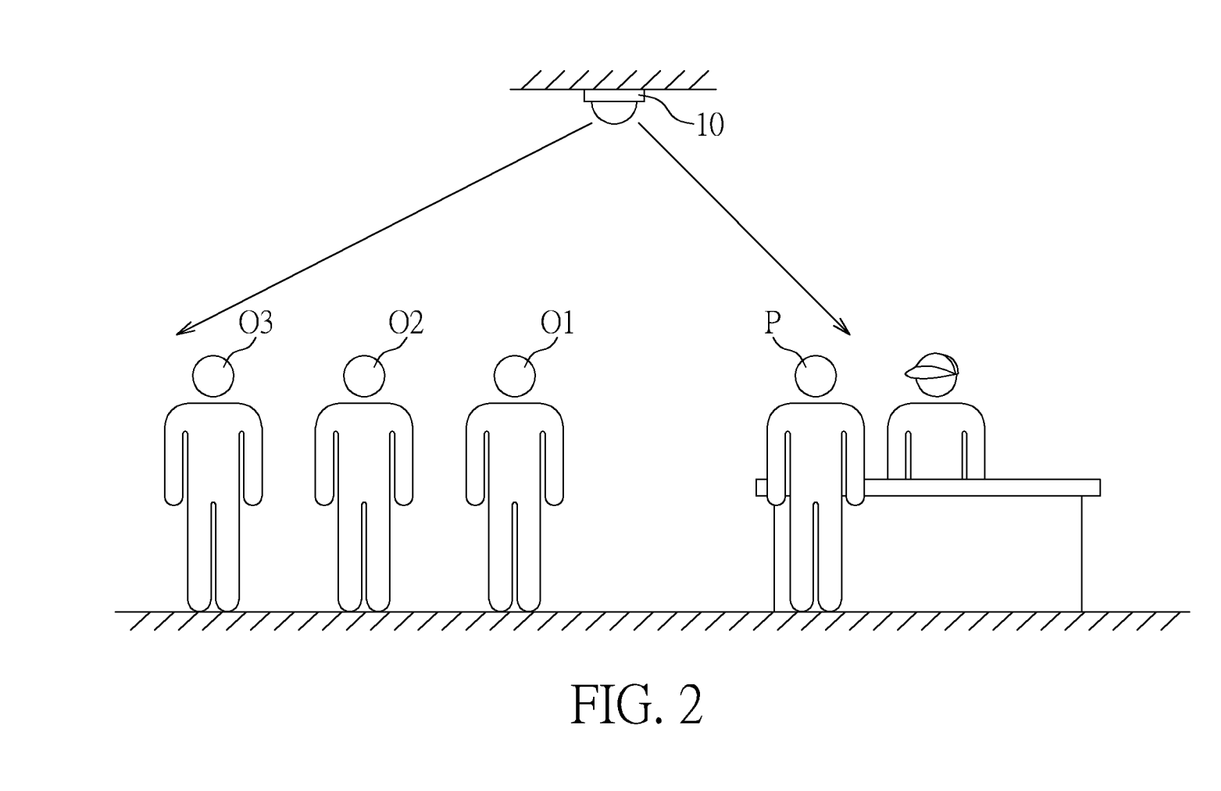
FIG. 2 is a diagram of the image analyzing apparatus according to the embodiment of the present invention.
Figure 3:
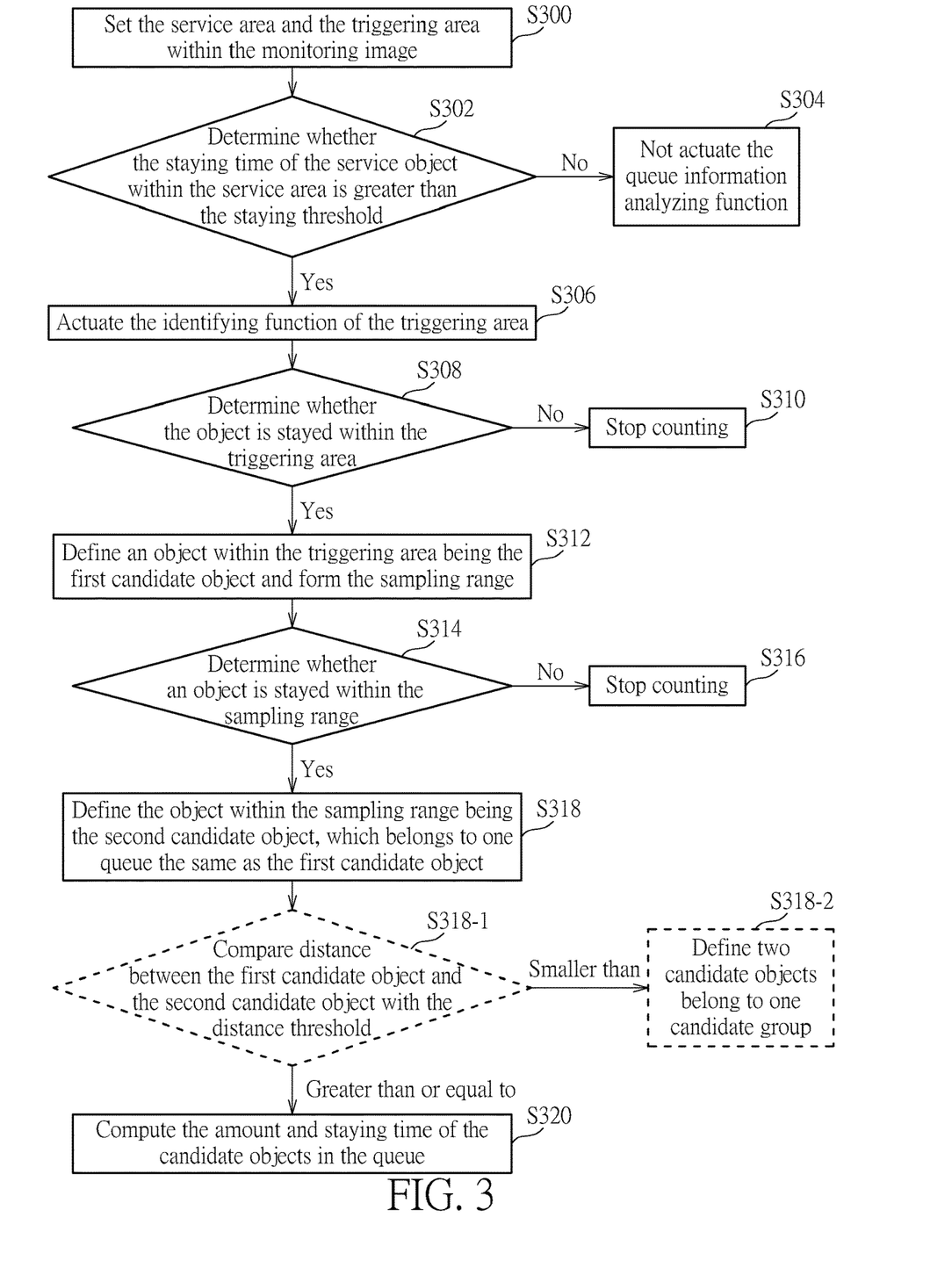
FIG. 3 is a flow chart of a queue information analyzing method according to the embodiment of the present invention.
Figure 4:
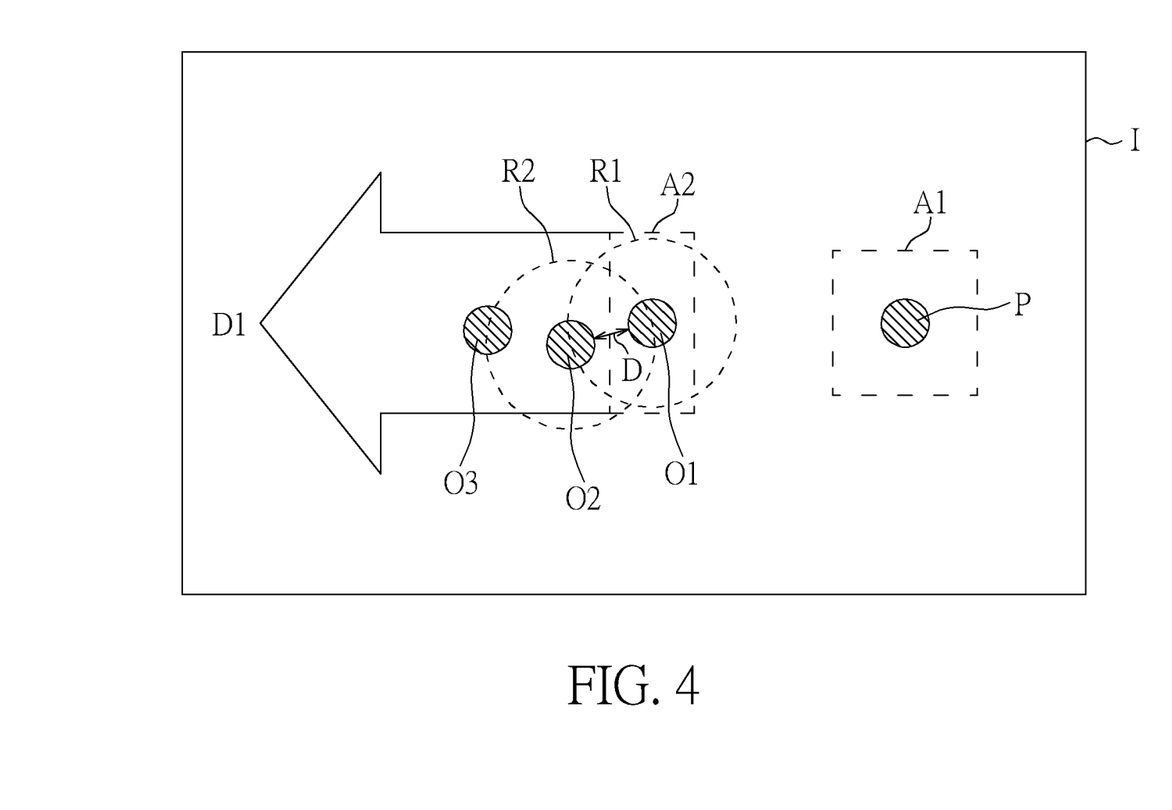
FIG. 4 is a diagram of a monitoring image acquired by the image analyzing apparatus 10 according to the embodiment of the present invention.

Please refer to FIG. 1 to FIG. 4. FIG. 1 is a functional block diagram of an image analyzing apparatus 10 according to an embodiment of the present invention. FIG. 2 is a diagram of the image analyzing apparatus 10 according to the embodiment of the present invention. FIG. 3 is a flow chart of a queue information analyzing method according to the embodiment of the present invention. FIG. 4 is a diagram of a monitoring image I acquired by the image analyzing apparatus 10 according to the embodiment of the present invention. The queue information analyzing method illustrated in FIG. 3 is suitable for the image analyzing apparatus 10 shown in FIG. 1. The image analyzing apparatus 10 can be installed in a market to provide a monitoring range covering the checkout counter. A monitored object can be defined as the customer who pays the bill or stands in a line, and the image analyzing apparatus 10 can trace the customer around the checkout counter for analyzing line-up information. The image analyzing apparatus 10 can include an image receiver 12 and an operation processor 14 electrically connected to each other. The image receiver 12 can be used to acquire the monitoring image I. The operation processor 14 can analyze the monitoring image I to execute the queue information analyzing method for acquiring line-up object information inside the monitoring image I.

The image analyzing apparatus 10 can be a server communicated with a camera in a remote connection manner, and the image receiver 12 can be a wire receiver or a wireless receiver adapted to receive the monitoring image I from the external camera. The image analyzing apparatus 10 further can be a built-in modular equipment of the camera; an image capturing unit (which is not shown in the figures) of the camera is used to capture the monitoring image I, and the image receiver 12 can be electrically connected to the image capturing unit for acquiring the monitoring image I.

For the queue information analyzing method, step S300 is executed for a start to set a service area A1 and a triggering area A2 within the monitoring image I. The service area A1 can be disposed adjacent to the triggering area A2. The service area A1 may be spaced from the triggering area A2, which means a line-up queue is distant from the checkout counter. Then, step S302 is executed to determine whether a staying time of a service object P within the service area A1 is greater than a staying threshold. If the staying time is smaller than the staying threshold, the service object P does not pay the bill, and step S304 is executed to not actuate a queue information analyzing function. If the staying time is equal to or greater than the staying threshold, the service object P is in the act of paying the bill, so that step S306 is executed to actuate an identifying function of the triggering area A2.

Then, step S308 is executed to determine whether an object is stayed within the triggering area A2. If there is no object stayed within the triggering area A2, step S310 is executed to stop counting. If the triggering area A2 contains the object, step S312 is executed to define the object within the triggering area A2 being a first candidate object O1 and then form a sampling range R1 via the first candidate object O1. After that, step S314 is executed to determine whether another object is stayed within the sampling range R1. If there is no object stayed within the sampling range R1, step S316 is executed to stop counting. If the sampling range R1 contains the object, step S318 is executed to define the object within the sampling range R1 being a second candidate object O2, and the second candidate object O2 and the first candidate object O1 belongs to one queue. Thus, the queue information analyzing method can identify how many candidate objects in the queue according to the foresaid steps. Final, step S320 is executed to compute an amount and a staying time of all the candidate objects in the queue.

After step S320, although the first candidate object O1 and the second candidate object O2 are represented as one queue, the present invention still can determine whether the first candidate object O1 and the second candidate object O2 are line-up objects in the queue, or are objects passing the checkout counter. Thus, the queue information analyzing method further can acquire a first accumulated time of the first candidate object O1 stayed within the triggering area A2, and a second accumulated time of the second candidate object O2 stayed within the sampling range R1. The first accumulated time and the second accumulated time can be compared with a first time threshold. If the first accumulated time and the second accumulated time are greater than or equal to the first time threshold, the first candidate object O1 and the second candidate object O2 are the line-up objects in the queue. If the first accumulated time and the second accumulated time are smaller than the first time threshold, the first candidate object O1 and the second candidate object O2 are passing-by object and not represented as the line-up objects.

The above-mentioned embodiment compares the first accumulated time and the second accumulated time with the same time threshold; however, an actual application may provide other options. For example, the first accumulated time and the second accumulated time may be respectively compared with time thresholds having different time length, or the first accumulated time is compared with a specific time threshold and the second accumulated time is compared with the first accumulated time. How to determine whether the candidate object belongs to the line-up object via analysis of the accumulated time may have a variety of manners, and a detailed description is omitted herein for simplicity. As shown in FIG. 4, step S318-1 can be optionally executed to compare a distance D between the first candidate object O1 and the second candidate object O2 with a distance threshold when the second candidate object O2 is confirmed in step S318. If the distance D is smaller than the distance threshold, step S318-2 is executed to define the first candidate object O1 and the second candidate object O2 belong to the same candidate group, which means two candidate objects O1 and O2 are integrated as one line-up unit. If the distance D is greater than or equal to the distance threshold, the first candidate object O1 and the second candidate object O2 are independent, and step S320 can be executed accordingly.

The distance D can be a shortest interval between borders of two candidate objects, or can be a straight line interval between geometric centers of two candidate objects, or can be an interval between any feature points of two candidate objects. The distance threshold can be one value or one range, and can be set in accordance with the market where the image analyzing apparatus 10 is installed, and the amount and an intensity of the line-up objects inside the queue; a detailed description is omitted herein for simplicity.

Then, the queue information analyzing method of the present invention further can form another sampling range R2 via the second candidate object O2 to identify whether a third candidate object O3 is stayed within the sampling range R2, and determine whether the third candidate object O3 belongs to the queue the same as the first candidate object O1 and the second candidate object O2 through above-mentioned steps. According to the foresaid process, the queue information analyzing method can decide whether the queue is ended or has other candidate objects. Generally, a dimension and a shape of the sampling range R2 are preferably identical with a dimension and a shape of the sampling range R1, which depend on actual demand.

Figure 5:
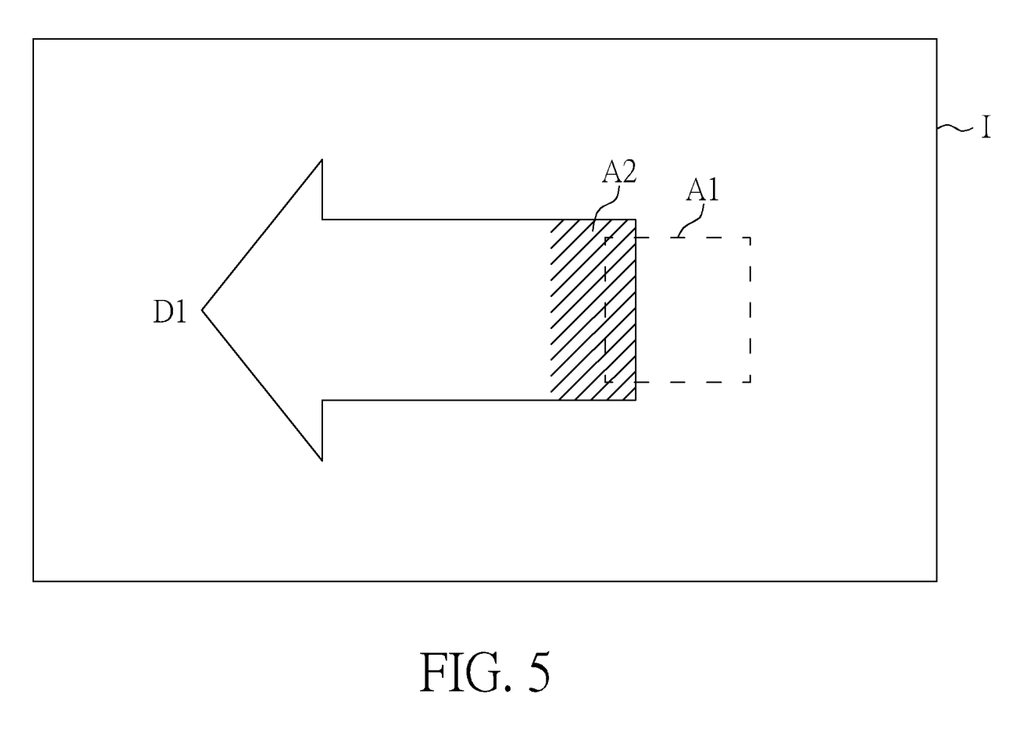
FIG. 5 is a diagram of the monitoring image according to another embodiment of the present invention.

Please refer to FIG. 4 and FIG. 5. FIG. 5 is a diagram of the monitoring image I according to another embodiment of the present invention. As the embodiment shown in FIG. 4, the service area A1 is spaced from the triggering area A2; the related design is common in an airport or a bank, and the line-up customer is distant from the customer in the checkout counter for preferred personal privacy. As the monitoring image I shown in FIG. 5, the service area A1 can be partly overlapped with the triggering area A2; in the market or the shop, the line-up customer may be close to the customer in the checkout counter for space economy.

Figure 6:
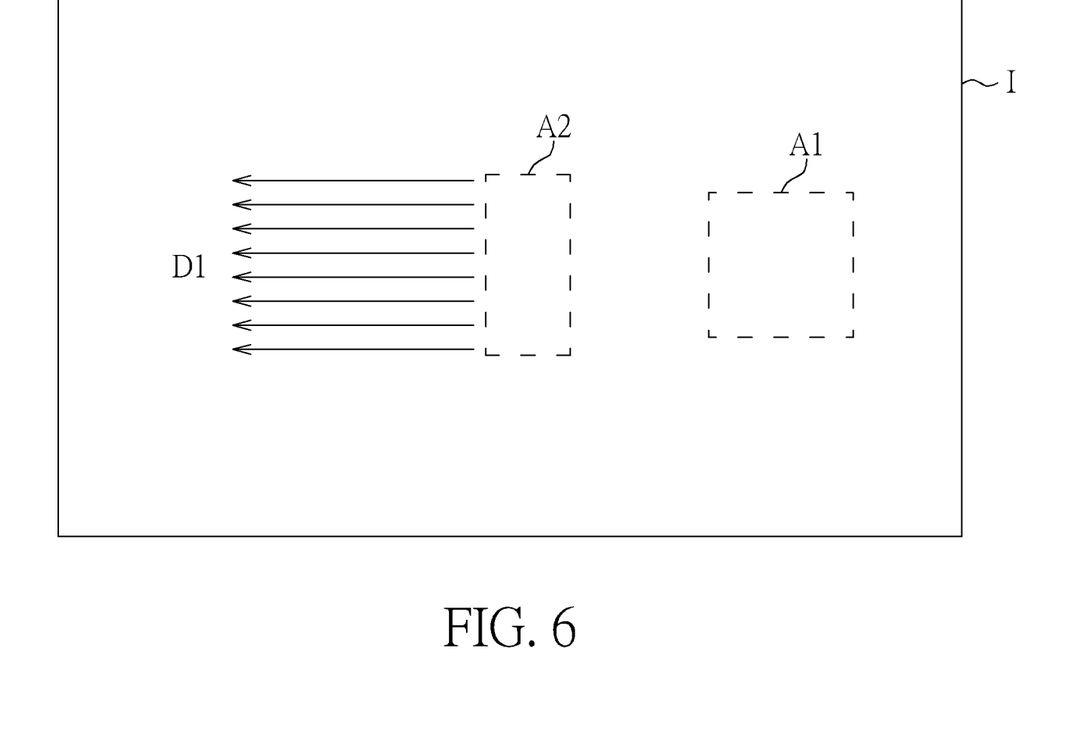
FIG. 6 and FIG. 7 are diagrams of the monitoring image according to another embodiment of the present invention.
Figure 7:
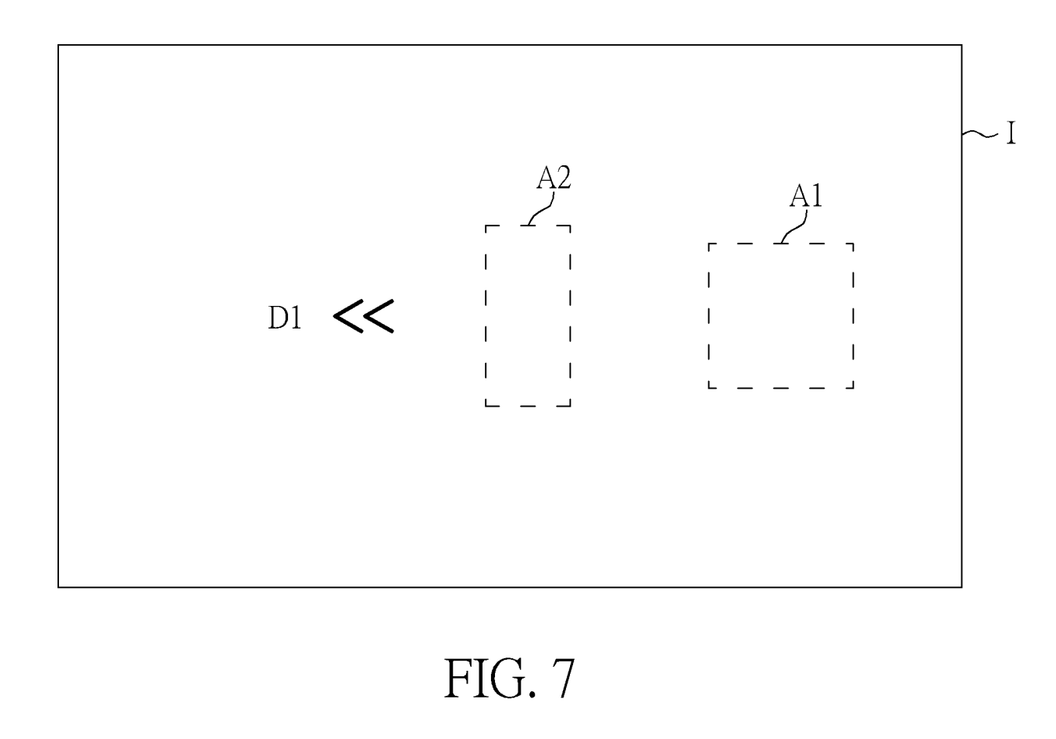

The triggering area A2 may have a sampling direction D1 of pointing from the service area A1 toward the triggering area A2, or pointing from the first candidate object O1 toward the second candidate object O2. The queue information analyzing method of the present invention may follow the sampling direction D1 to determine whether the sampling range of the previous candidate object contains the later candidate object. The sampling direction D1 can affect an extending direction of the queue. Please refer to FIG. 4, FIG. 6 and FIG. 7. FIG. 6 and FIG. 7 are diagrams of the monitoring image I according to another embodiment of the present invention. As shown in FIG. 4, the sampling direction D1 may be represented as one arrow icon, and the triggering area A2 can be a rear region of the arrow icon. As shown in FIG. 6, the sampling direction D1 may be represented as a plurality of arrow icons, and the triggering area A2 can be a rear region of those arrow icons. It should be mentioned that the sampling direction D1 may only indicate sampling orientation but does not constrain the sampling range. As the embodiment shown in FIG. 7, several small arrow patterns are used to indicate the sampling direction D1; any object with the moving direction conforming to the arrow patterns belongs to a scope of the candidate object no matter whether the object is stayed within a region of the arrow patterns or not.

Besides, the sampling direction D1 shown in FIG. 4, FIG. 6 and FIG. 7 may slightly change its direction or have a small-scope deviation. In some situation, the second candidate object O2 stayed within the sampling range R1, which conforms to a trend of the sampling direction D1 but is not substantially parallel to the sampling direction D1 due to slight turning, still can be represented as the second candidate object O2 defined by the queue information analyzing method of the present invention. Allowable tolerance about the turning and deviated degrees can be set according to the market where the image analyzing apparatus 10 is installed, and the amount and the intensity of the line-up objects in the queue, and a detailed description is omitted herein for simplicity.

Figure 8:
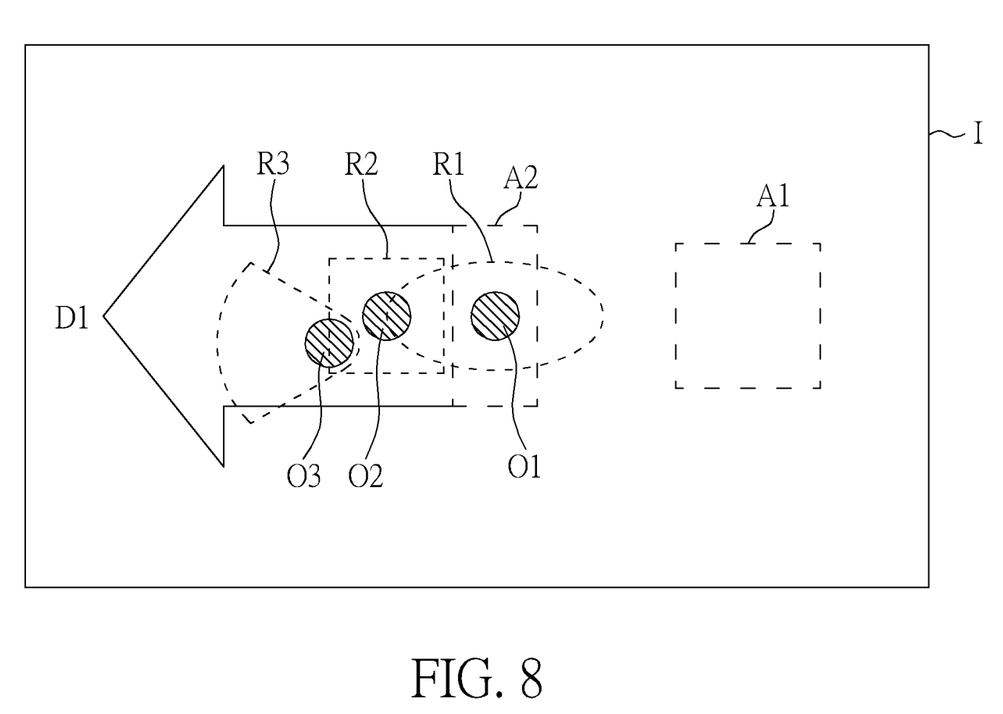
FIG. 8 is a diagram of the monitoring image according to the embodiment of the present invention.

Please refer to FIG. 4 and FIG. 8. FIG. 8 is a diagram of the monitoring image I according to the embodiment of the present invention. As shown in FIG. 4, a feature pint of the first candidate object O1 can be the center of the sampling range R1, and a radius of the sampling range R1 is a predefined length. The feature pint can be a geometric center, a gravity center or any structural point of the first candidate object O1. The predefined length can be set according to an environment where the mage analyzing apparatus 10 is installed; for example, the checkout queue in the market may correspond to the predefined length with a large value because the customers may be distant from each other, and the checkout queue in the concert may correspond to the predefined length with a small value because the customers may be close to each other. Moreover, a shape of the sampling range is not limited a circular form. The elliptical-shaped sampling range R1, the rectangular-shaped sampling range R2 and/or the fan-shaped sampling range R3 can be applied and shown in FIG. 8. The plurality of candidate objects may respectively have the sampling ranges with different or identical shape, which depends on actual demand.

The sampling range in the queue information analyzing method of the present invention is not limited to a regular form of the above-mentioned embodiments, and can by any irregular form, such as a dumbbell-shaped form. The dumbbell-shaped form may have two enlarged regions adapted to respectively define two adjacent candidate objects in the queue, and has a narrow region connected between the enlarged regions adapted to prevent someone who walks through the queue from being defined as the line-up object.

Figure 9:
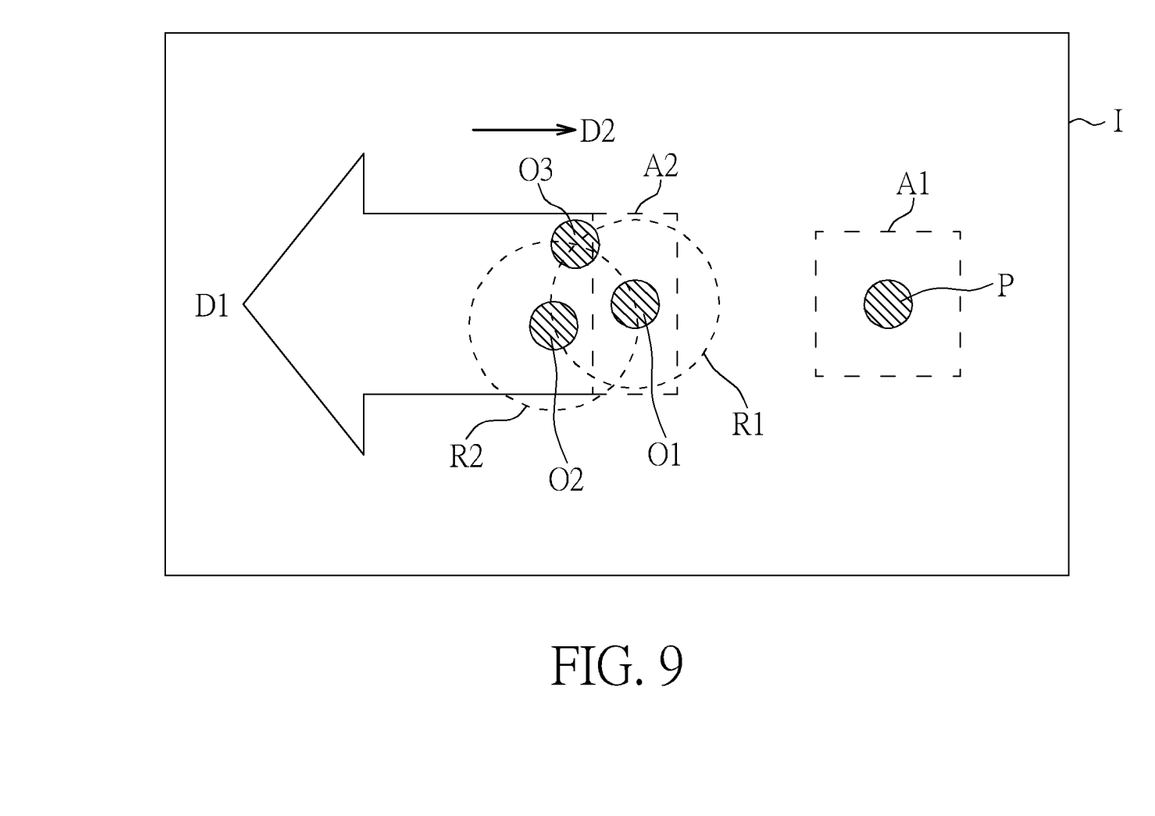
FIG. 9 is a diagram of the monitoring image according to the embodiment of the present invention.

Please refer to FIG. 9. FIG. 9 is a diagram of the monitoring image I according to the embodiment of the present invention. The accumulated time of the third candidate object O3 stayed within the sampling range R2 greater than or equal to the first time threshold can define that the third candidate object O3 belongs to the queue; however, the queue information analyzing method further can determine whether the third candidate object O3 (or any candidate object) is stayed between the first candidate object O1 and the second candidate object O2 (which means the former of the said any candidate object), and determine whether an accumulated time stayed between the first candidate object O1 and the second candidate object O2 is greater than a second time threshold. If the accumulated time is smaller than the second time threshold, the third candidate object O3 may move away and then back quickly, so that the third candidate object O3 can be defined as the line-up object in the queue. If the accumulated time is greater than or equal to the second time threshold, the third candidate object O3 changes its position relative to other candidate objects and does not belong to the line-up object in the queue.

Figure 10:
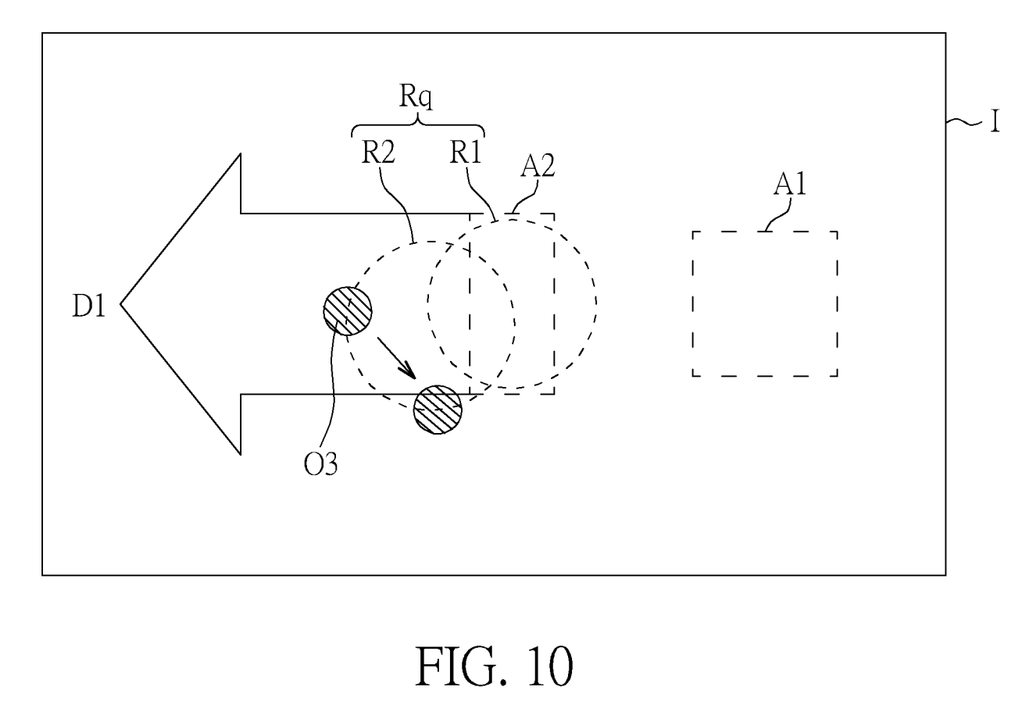
FIG. 10 is a diagram of the monitoring image according to the embodiment of the present invention.

Please refer to FIG. 10. FIG. 10 is a diagram of the monitoring image I according to the embodiment of the present invention. The queue information analyzing method can record all the sampling range (such as the sampling ranges R1 and R2) to form a queue range Rq. A containing amount of the sampling range inside the queue range Rq, and an entering frequency of the third candidate object O3 (or any candidate object) joining the queue range Rq can be acquired. The entering frequency can be compared with a computed value of the containing amount. The computed value of the containing amount may be a half or a quarter of the containing amount. If the entering frequency is smaller than the computed value of the containing amount, the third candidate object O3 may stand by but does not enter the queue. If the entering frequency is greater than or equal to the computed value of the containing amount, and a moving direction D2 of the third candidate object O3 is similar to the sampling direction D1, the third candidate object O3 may be a store clerk served for the line-up customer and does not belong to the queue. If the entering frequency is greater than or equal to the computed value of the containing amount, and the moving direction D2 is different from the sampling direction D1, the third candidate object O3 can be defined as the line-up customer in the queue.

The queue information analyzing method and the image analyzing apparatus of the present invention can analyze the monitoring image to rapidly acquire information of the line-up customer, to accurately distinguish the customers in the checkout counter from the line-up customers, and to compute the amount, a total staying time and an average staying time of the line-up customers, so that the shopkeeper can realize line-up information of the customers for assigning the shop clerk to rearrange the crowded customers or reassigning the shop clerk to improve work productivity. Comparing to the prior art, the present invention can utilize image analyzing technique to acquire the line-up information, and accordingly rearrange the clerks for preferred service quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A queue information analyzing method applied to an image analyzing apparatus, a monitoring image acquired by the image analyzing apparatus having a triggering area, the queue information analyzing method comprising:

identifying a first candidate object stayed within the triggering area;
forming a sampling range around the first candidate object by setting the first candidate object as a center of the sampling range;
determining whether a second candidate object stayed within the sampling range belongs to a queue of the first candidate object; and
acquiring an amount and a staying time of candidate objects in the queue according to a determination result of the second candidate object;
wherein a center of the sampling range is changed according to a determination result of the second candidate object.

2. The queue information analyzing method of claim 1, further comprising:
acquiring a first accumulated time of the first candidate object stayed within the triggering area to compare the first accumulated time with a first time threshold; and
setting the first candidate object as a line-up object in the queue when the first accumulated time is greater than or equal to the first time threshold.

3. The queue information analyzing method of claim 1, further comprising:
acquiring a second accumulated time of the second candidate object stayed within the sampling range to compare the second accumulated time with a first time threshold; and
setting the second candidate object as a line-up object in the queue when the second accumulated time is greater than or equal to the first time threshold.

4. The queue information analyzing method of claim 1, wherein the first candidate object and the second candidate object are defined as one candidate group when a distance between the first candidate object and the second candidate object is smaller than a distance threshold.

5. The queue information analyzing method of claim 1, further comprising:
forming another sampling range via the second candidate object;
identifying whether a third candidate object stays within the another sampling range; and
determining whether the third candidate object belongs to the queue according to an identifying result.

6. The queue information analyzing method of claim 5, further comprising:
determining the third candidate object does not belong to the queue when a staying time of the third candidate object between the first candidate object and the second candidate object is greater than a second time threshold.

7. The queue information analyzing method of claim 5, further comprising:
setting the sampling range and the another sampling range as a queue range; and
comparing a frequency of the third candidate object entering the queue range with an amount of the said sampling ranges inside the queue range for determining whether the third candidate object belongs to the queue.

8. The queue information analyzing method of claim 7, wherein the triggering area has a sampling direction of pointing from the first candidate object toward the second candidate object, and a moving direction of the third candidate object within the queue range is different from the sampling direction.

9. The queue information analyzing method of claim 1, further comprising:
setting a service area adjacent to the triggering area; and
actuating an identifying function of the triggering area when a staying time of a service object within the service area is greater than a staying threshold.

10. The queue information analyzing method of claim 1, wherein the triggering area has a sampling direction, and the queue information analyzing method determines whether the second candidate object is stayed within the sampling range according to the sampling direction.

11. An image analyzing apparatus, comprising:
an image receiver adapted to acquire a monitoring image; and
an operation processor electrically connected to the image receiver, the operation processor being adapted to identify a first candidate object stayed within the triggering area, form a sampling range around the first candidate object by setting the first candidate object as a center of the sampling range, determine whether a second candidate object stayed within the sampling range belongs to a queue of the first candidate object, and acquire an amount and a accumulated time of candidate objects in the queue according to a determination result of the second candidate object for acquiring line-up object information inside the monitoring image, wherein a center of the sampling range is changed according to a determination result of the second candidate object.

12. The image analyzing apparatus of claim 11, wherein the operation processor is further adapted to acquire a first accumulated time of the first candidate object stayed within the triggering area to compare the first accumulated time with a first time threshold, and set the first candidate object as a line-up object in the queue when the first accumulated time is greater than or equal to the first time threshold.

13. The image analyzing apparatus of claim 11, wherein the operation processor is further adapted to acquire a second accumulated time of the second candidate object stayed within the sampling range to compare the second accumulated time with a first time threshold, and set the second candidate object as a line-up object in the queue when the second accumulated time is greater than or equal to the first time threshold.

14. The image analyzing apparatus of claim 11, wherein the first candidate object and the second candidate object are defined as one candidate group when a distance between the first candidate object and the second candidate object is smaller than a distance threshold.

15. The image analyzing apparatus of claim 11, wherein the operation processor is further adapted to form another sampling range via the second candidate object, identify whether a third candidate object stays within the another sampling range, and determine whether the third candidate object belongs to the queue according to an identifying result.

16. The image analyzing apparatus of claim 15, wherein the operation processor is further adapted to determine the third candidate object does not belong to the queue when a staying time of the third candidate object between the first candidate object and the second candidate object is greater than a second time threshold.

17. The image analyzing apparatus of claim 15, wherein the operation processor is further adapted to set the sampling range and the another sampling range as a queue range, and compare a frequency of the third candidate object entering the queue range with an amount of the said sampling ranges inside the queue range for determining whether the third candidate object belongs to the queue.

18. The image analyzing apparatus of claim 17, wherein the triggering area has a sampling direction of pointing from the first candidate object toward the second candidate object, and a moving direction of the third candidate object within the queue range is different from the sampling direction.

19. The image analyzing apparatus of claim 11, wherein the operation processor is further adapted to set a service area adjacent to the triggering area, and actuate an identifying function of the triggering area when a staying time of a service object within the service area is greater than a staying threshold.

20. The image analyzing apparatus of claim 11, wherein the triggering area has a sampling direction, and the queue information analyzing method determines whether the second candidate object is stayed within the sampling range according to the sampling direction.

* * * * *